United States Patent
Hu et al.

(10) Patent No.: US 11,913,104 B2
(45) Date of Patent: Feb. 27, 2024

(54) SHORT-PROCESS HIGH-PERFORMANCE FORMING METHOD OF HIGH-STRENGTH ALUMINUM ALLOY, AND USE THEREOF

(71) Applicant: WUHAN UNIVERSITY OF TECHNOLOGY, Wuhan (CN)

(72) Inventors: Zhili Hu, Wuhan (CN); Pengfei Wei, Wuhan (CN); Lin Hua, Wuhan (CN)

(73) Assignee: WUHAN UNIVERSITY OF TECHNOLOGY, Wuhan (CN)

( * ) Notice: Subject to any disclaimer, the term of this patent is extended or adjusted under 35 U.S.C. 154(b) by 0 days.

(21) Appl. No.: 18/208,264

(22) Filed: Jun. 10, 2023

(65) Prior Publication Data

US 2023/0416895 A1 Dec. 28, 2023

(30) Foreign Application Priority Data

Jun. 22, 2022 (CN) .......................... 202210714230.9

(51) Int. Cl.
*C22F 1/04* (2006.01)
*C21D 9/46* (2006.01)
*C22F 1/00* (2006.01)

(52) U.S. Cl.
CPC .................. *C22F 1/04* (2013.01); *C21D 9/46* (2013.01); *C22F 1/002* (2013.01)

(58) Field of Classification Search
None
See application file for complete search history.

(56) References Cited

FOREIGN PATENT DOCUMENTS

| CN | 110066931 B | | 8/2020 |
| CN | 111549266 B | | 8/2020 |
| CN | 114525459 A | * | 5/2022 |
| CN | 114525459 A | | 5/2022 |
| CN | 114941114 A | | 8/2022 |

OTHER PUBLICATIONS

Machine Translation of CN 110066931 A, 6 pages (Year: 2019).
Machine Translation of CN 111549266 B, 11 pages (Year: 2020).
(Continued)

*Primary Examiner* — Anthony M Liang
(74) *Attorney, Agent, or Firm* — Tutunjian & Bitetto, P.C.

(57) ABSTRACT

The present disclosure provides a short-process high-performance forming method of a high-strength aluminum alloy, and use thereof. In the present disclosure, pre-hardening treatment is conducted on an obtained W-temper aluminum alloy sheet blank after a solution treatment and quenching, to obtain a pre-hardened aluminum alloy sheet blank for batch supply. The pre-hardened aluminum alloy sheet blank is subjected to plastic forming, to obtain a component with satisfactory performances. After the pre-hardening treatment, a high-strength aluminum alloy sheet blank forms a GPII zone that is completely coherent with a matrix, and has a room-temperature formability exceeding that off traditional soft sheet blank. Moreover, the GPII zones interact with dislocations during the forming, resulting in planar slips. In this way, large-scale dynamic recovery is more effectively suppressed, thus enhancing a work hardening ability of a formed component. In addition, a large number of nano-stacking faults are generated during deformation.

1 Claim, 5 Drawing Sheets

(56) References Cited

OTHER PUBLICATIONS

Machine Translation of CN 114525459 A, 6 pages (Year: 2022).
Machine Translation of CN 114941114 A, 9 pages (Year: 2022).
Chinese Patent Office—First Office Action (dated Sep. 14, 2022) Mailed for Appln 202210714230.9 (Origingal).
Chinese Patent Office—First Office Action (dated Sep. 14, 2022) Mailed for Appln 202210714230.9 (Machine Translation).
Chinese Patent Office—Notification to Grant Patent Right for Invention (dated Jan. 2, 2023) for Appln 202210714230.9 (Origingal).
Chinese Patent Office—Notification to Grant Patent Right for Invention (dated Jan. 2, 2023) for Appln 202210714230.9 (Machine Translation).

\* cited by examiner

SHORT-PROCESS HIGH-PERFORMANCE FORMING METHOD OF HIGH-STRENGTH ALUMINUM ALLOY, AND USE THEREOF

CROSS REFERENCE TO RELATED APPLICATION

This patent application claims the benefit and priority of Chinese Patent Application No. 202210714230.9, filed with the China National intellectual Property Administration on Jun. 22, 2022, the disclosure of which is incorporated by reference herein in its entirety as part of the present application.

TECHNICAL FIELD

The present disclosure relates to the technical field of sheet metal forming (SMF) processing, in particular to a short-process high-performance forming method of a high-strength aluminum alloy, and use thereof.

BACKGROUND

In recent years, aluminum alloys have been used more and more widely in the aerospace field. The forming methods of aluminum alloy parts mainly include cold forming and hot forming. Heat-treatable strengthened aluminum alloys have poor cold forming properties, while hot forming can obtain well-formed and high-precision aluminum alloy parts. However, hot forming has complex procedures and high production costs. Moreover, the hot forming or warm forming is sensitive to temperature, which can easily affect the distribution of precipitated phases to reduce the strength of an obtained aluminum alloy sheet. The cold forming of heat-treatable aluminum alloys is limited mainly due to: 1. There is poor cold formability. Except for soft O-temper sheets, the remaining heat treatment states are difficult to form at room temperature. 2. In order to obtain the required mechanical properties after forming, solution treatment (resulting in low precision) and long-term artificial aging are required (for example, 7xxx series aluminum alloys require artificial aging at 120° C. for 24 h), and have a low production efficiency. In view of this, there is an urgent need for a cold forming process with simple process, high production efficiency, and forming performance as well as post-forming performance that meet the requirements.

At present, the research on cold forming of aluminum alloys mainly focuses on the composition design of aluminum alloys and the processing methods of aluminum alloys before forming. Patent CN 10066931B disclosed an aluminum alloy suitable for cold forming and a preparation method thereof. In this method, a ZnYb strengthening phase, a ZnTb strengthening phase, and a MgZn strengthening phase are introduced into an aluminum alloy structure, and grains are refined with Sc and Zr elements to obtain a high-strength aluminum alloy with desirable cold formability. However, this method is only applicable to specific aluminum alloy materials.

Patent CN111549266B disclosed a microstructure control method for improving formability of an aluminum alloy sheet for a body structure. In this method, a structure with alternating distribution of coarse/fine grains is obtained by hot rolling, homogenization, ultra-low-temperature cold rolling, two-stage heat treatment, ultra-low-temperature cold rolling, two-stage solution treatment, quenching, and low-temperature aging in sequence, and has desirable stamping formability at room temperature. However, this method requires a highly complicated process for producing sheets. Moreover, the properties after forming are lower than the room-temperature properties of 7xxx series aluminum alloys, such that long-term artificial aging is needed.

SUMMARY

In view of the existing technical problems, an objective of the present disclosure is to provide a short-process high-performance forming method of a high-strength aluminum alloy, and use thereof. In this method, an aluminum alloy sheet blank is subjected to pre-hardening treatment before cold forming. In an obtained pre-hardened alloy structure, larger GPII zones dominate, and have a cold forming performance exceeding that of a traditional O-temper sheet. Through an interaction mechanism between the GPII zones and dislocations during the forming, the strength and toughness after forming exceed that of the T6 and T8 tempers. In the present disclosure, the method ensures the mechanical properties of a formed component while obtaining better cold forming properties. In addition, the pre-hardening treatment of the aluminum alloy sheet blank is completed in advance by sheet suppliers, and a microstructure stability of the sheet at room temperature ensures the reliability of batch supply. Therefore, the sheet blank can be directly put into a cold forming production line for forming after being purchased, thus effectively shortening a production cycle, reducing costs, and improving a production efficiency.

To achieve the above objective, the present disclosure adopts the following technical solutions:

The present disclosure provides a short-process high-performance forming method of a high-strength aluminum alloy, including the following steps:

step S1, conducting a solution treatment and quenching on a heat-treatable strengthened aluminum alloy sheet blank, to obtain a W-temper aluminum alloy sheet blank;

step S2, conducting pre-hardening treatment on the W-temper aluminum alloy sheet blank for 1 h to 24 h, where a 2000 series aluminum alloy is subjected to the pre-hardening treatment at 60° C. to 180° C., a 6000 series aluminum alloy is subjected to the pre-hardening treatment at 60° C. to 160° C., and a 7000 series aluminum alloy is subjected to the pre-hardening treatment at 70° C. to 100° C.; after the pre-hardening treatment on the sheet blank, the 2000 series aluminum alloy forms a GPII zone with a diameter of 1 nm to 5 nm and a length of 1 nm to 15 nm to 15 nm, the 700 series aluminum alloy forms a GPII zone with a diameter of 1 nm to 15 nm and a thickness of 1 to 2 atomic layers, and the 6000 series aluminum alloy forms a GPII zone with a diameter of 1 nm to 5 nm and a length of 1 nm to 30 nm; the GPII zone of the 6000 series aluminum alloy includes initial β" and pre-β", and the GPII zones formed by each of obtained pre-hardened sheet blanks account for 60% to 100%;

step S3, using each of the pre-hardened sheet blanks as a batch supply blank for cold forming: and step S4, conducting cold forming on each of the pre-hardened sheet blanks, such that each part of the sheet blank has a deformation of 1% to 20%, to obtain a final component.

Further, the heat-treatable strengthened aluminum alloy sheet blank is selected from the group consisting of a 2000 series aluminum alloy sheet blank, a 6000 series aluminum alloy sheet blank, and a 7000 series aluminum alloy sheet blank.

Further, the present disclosure provides use of the short-process high-performance forming method of a high-strength aluminum alloy, where the 2000 series aluminum alloy is applied to sectionalized forming and integral forming of a bottom of a rocket fuel storage tank after the solution treatment, the quenching, and the pre-hardening treatment.

Further, the sectionalized forming of the bottom of the rocket fuel storage tank specifically includes the following steps:

step S1, conducting a solution treatment and quenching on a heat-treatable strengthened aluminum alloy sheet blank, to obtain a W-temper aluminum alloy sheet blank;

step S2, conducting pre-hardening treatment on the W-temper aluminum alloy sheet blank, where the 2000 series aluminum alloy is subjected to the pre-hardening treatment at 60° C. to 180° C.; after the pre-hardening treatment on the sheet blank, the 2000 series aluminum alloy forms the GPII zone with a diameter of 1 nm to 5 nm and a length of 1 nm to 15 nm; and the GPII zone accounts for 60% to 100%;

step S3, using obtained pre-hardened sheet blank as a batch supply blank for cold forming, where the pre-hardened sheet blank is subjected to forming immediately, or stored for not more than 18 months before the forming;

step S4, conducting cold forming on the pre-hardened sheet blank, such that the sheet blank has a deformation of 1% to 20%; and step S5, conducting friction stir welding on an obtained sectionalized component into an integral component, to obtain a bottom of a rocket fuel storage tank with mechanical properties exceeding T6 and T8 tempers without the solution treatment and artificial aging.

Further, the integral forming of the bottom of the rocket fuel storage tank specifically includes the following steps:

step S1, conducting a solution treatment and quenching on a heat-treatable strengthened aluminum alloy sheet blank, to obtain a W-temper aluminum alloy sheet blank;

step S2, conducting pre-hardening treatment on the W-temper aluminum alloy sheet blank, where the 2000 series aluminum alloy is subjected to the pre-hardening treatment at 60° C., to 180° C.; after the pre-hardening treatment on the sheet blank, the 2000 series aluminum alloy forms the GPII zone with a diameter of 1 nm to 5 nm and a length of 1 nm to 15 nm; and the GPII zone accounts for 60% to 100%;

step S3, using obtained pre-hardened sheet blank as a batch supply blank for cold forming, where the pre-hardened sheet blank is subjected to forming immediately, or stored for not more than 18 months before the forming;

step S4, conducting friction stir welding on the pre-hardened sheet blank, conducting cold forming, such that the sheet blank has a deformation of 1% to 20%, to obtain a bottom of a rocket fuel storage tank with mechanical properties exceeding T6 and T8 tempers without the solution treatment and artificial aging.

Further, the integral forming of the bottom of the rocket fuel storage tank specifically includes the following steps:

step S1, conducting friction stir welding on the 2000 series aluminum alloy sheet blank, and subjecting an obtained welded sheet blank to the solution treatment and quenching, to obtain the W-temper aluminum alloy sheet blank;

step S2, conducting pre-hardening treatment on the W-temper aluminum alloy sheet blank, where the 2000 series aluminum alloy is subjected to the pre-hardening treatment at 60° C. to 180° C.; after the pre-hardening treatment on the sheet blank, the 2000 series aluminum alloy forms the GPII zone with a diameter of 1 nm to 5 nm and a length of 1 nm to 15 nm; and the GPII zone accounts for 60% to 100%; and the pre-hardened sheet blank is subjected to forming immediately, or stored for not more than 18 months before the forming; and step S3, conducting cold forming on an obtained welded pre-hardened sheet blank, to obtain a bottom of a rocket fuel storage tank with mechanical properties exceeding T6 and T8 tempers without the solution treatment and artificial aging.

Accordingly, compared with the prior art, the present disclosure has the following advantages:

(1) The aluminum alloy sheet blank after pre-hardening treatment is in a stable state, and does not change its structure due to natural aging. Pre-hardened blanks can be stored for up to 18 months. Therefore, it is convenient for storage and transportation, and it is beneficial for sheet suppliers to conduct batch processing and supply, thereby improving a production efficiency and reducing costs.

(2) The parts after cold forming of the pre-hardened aluminum alloy sheet blank do not change their structure due to natural aging. Therefore, it is convenient for storage and transportation, and it is beneficial for part manufacturers to conduct batch processing and supply, thereby improving a production efficiency and reducing costs.

(3) A pre-hardened alloy has a GPII zone structure with large size and desirable stability. After the pre-hardening treatment, a high-strength aluminum alloy sheet blank forms a larger and more stable GPII zone structure than a T4 temper, and has a room-temperature formability exceeding that of a traditional soft (O-temper) sheet blank. Moreover, organization of the GPII zone interacts with dislocations during the forming, resulting in planar slip. In this way, large-scale dynamic restoration is more effectively suppressed, thus enhancing a work hardening ability of a formed component. In addition, a large number of nano-stacking faults are generated during deformation. A strengthening effect of the nano-stacking fault further improves a strength of the formed component, such that the mechanical properties after forming are better than those of T6- and T8-temper aluminum alloys.

(4) Through the cold forming of the present disclosure, the forming is reduced from 7 steps (traditional cold forming) to 4 steps, and a duration of the whole process is reduced by not less than 12 h. After the cold forming, mechanical properties that meet the requirements can be obtained, and heat treatment steps such as solution treatment and aging are omitted after forming. In this way, energy consumption of the forming is greatly reduced, a production cycle is shortened, and a production efficiency is improved.

DETAILED DESCRIPTION OF THE EMBODIMENTS

The present disclosure is further specifically described below with reference to the accompanying drawings through examples.

Figure 1:
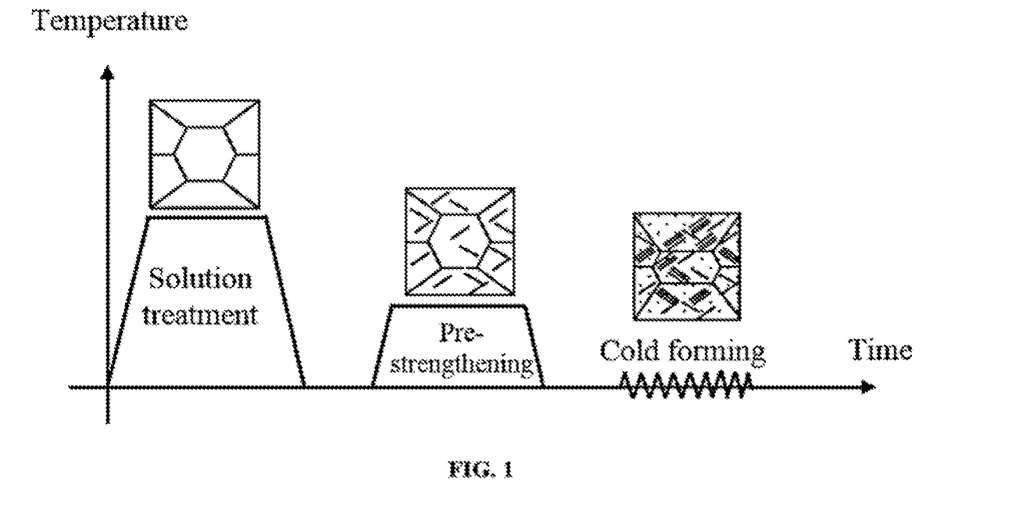
FIG. 1 shows a processing route of pre-hardening treatment and cold forming of the present disclosure.
Figure 3:
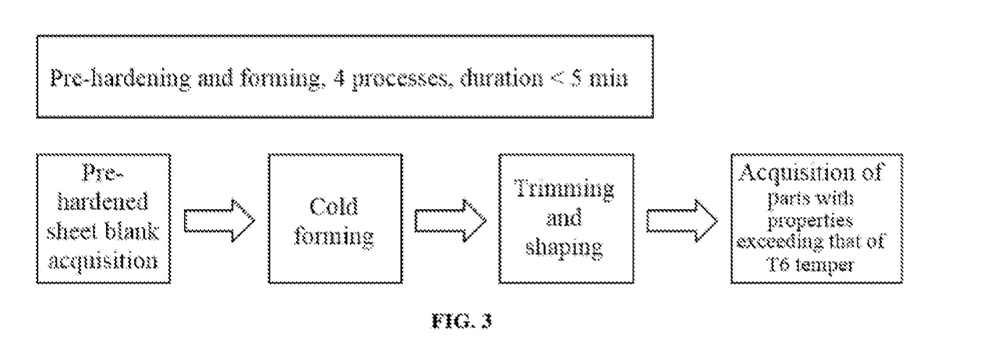
FIG. 3 shows a flow chart of a pre-hardening treatment and cold forming procedure in the present disclosure.

As shown in FIG. 1 and FIG. 3, the present disclosure provides a short-process high-performance forming method of a high-strength aluminum alloy, including the following steps:
(1) conducting a solution treatment and quenching on a heat-treatable strengthened aluminum alloy sheet blank, to obtain a W-temper aluminum alloy sheet blank;
(2) conducting pre-hardening treatment on the W-temper aluminum alloy sheet blank for 1 h to 24 h, where a 2000 series aluminum alloy is subjected to the pre-hardening treatment at 60° C. to 180° C., a 6000 series aluminum alloy is subjected to the pre-hardening treatment at 70° C. to 160° C., and a 7000 series aluminum alloy is subjected to the pre-hardening treatment at 70° C. to 100° C.; after the pre-hardening treatment on the sheet blank, the 2000 series aluminum alloy forms a GPII zone with a diameter of 1 nm to 5 nm and a length of 1 nm to 15 nm, the 7000 series aluminum alloy forms a GPII zone with a diameter of 1 nm to 15 nm and a thickness of 1 to 2 atomic layers, and the 6000 series aluminum alloy forms a GPII zone with a diameter of 1 nm to 5 nm and a length of 1 nm to 30 nm; the GPII zone of the 6000 series aluminum alloy includes initial β" and pre-β", and the GPII zones formed by each of obtained pre-hardened sheet blanks account for 60% to 100%;
(3) using each of the pre-hardened sheet blanks as a batch supply blank for cold forming; and
(4) conducting cold forming on each of the pre-hardened sheet blanks, to obtain a final component without subsequent aging.

The present disclosure further provides use of the short-process high-performance forming method of a high-strength aluminum alloy, where the 2000 series aluminum alloy is applied to sectionalized forming and integral forming of a bottom of a rocket fuel storage tank after the solution treatment, the quenching, and the pre-hardening treatment.

In the present disclosure, the sectionalized forming of the bottom of the rocket fuel storage tank specifically includes the following steps:
step S1, conducting a solution treatment and quenching on a heat-treatable strengthened aluminum alloy sheet blank, to obtain a W-temper aluminum alloy sheet blank;
step S2, conducting pre-hardening treatment on the W-temper aluminum alloy sheet blank, where the 2000 series aluminum alloy is subjected to the pre-hardening treatment at 60° C. to 180° C.; after the pre-hardening treatment on the sheet blank, the 2000 series aluminum alloy forms the GPII zone with a diameter of 1 nm to 5 nm and a length of 1 nm to 15 nm; and the GPII zone account for 60% to 100%;
step S3, using obtained pre-hardened sheet blank as a batch supply blank for cold forming, where the pre-hardened sheet blank is subjected to forming immediately, or stored for not more than 18 months before the forming;
step S4, conducting cold forming on the pre-hardened sheet blank, such that the sheet blank has a deformation of 1% to 20%; and
step S5, conducting friction stir welding on an obtained sectionalized component into an integral component, to obtain a bottom of a rocket fuel storage tank with mechanical properties exceeding T6 and T8 tempers without the solution treatment and artificial aging.

In the present disclosure, the integral forming of the bottom of the rocket fuel storage tank specifically includes the following steps:
step S1, conducting a solution treatment and quenching on a heat-treatable strengthened aluminum alloy sheet blank, to obtain a W-temper aluminum alloy sheet blank;
step S2, conducting pre-hardening treatment on the W-temper aluminum alloy sheet blank, where the 2000 series aluminum alloy is subjected to the pre-hardening treatment at 60° C. to 180° C.; after the pre-hardening treatment on the sheet blank, the 2000 series aluminum alloy forms the GPII zone with a diameter of 1 nm to 5 nm and a length of 1 nm to 15 nm; and the GPII zones account for 60% to 100%;
step S3, using obtained pre-hardened sheet blank as a batch supply blank for cold forming, where the pre-hardened sheet blank is subjected to forming immediately, or stored for not more than 18 months before the forming;
step S4, conducting friction stir welding on the pre-hardened sheet blank, conducting cold forming, such that the sheet blank has a deformation of 1% to 20%, to obtain a bottom of a rocket fuel storage tank with mechanical properties exceeding T6 and T8 tempers without the solution treatment and artificial aging.

Figure 2:
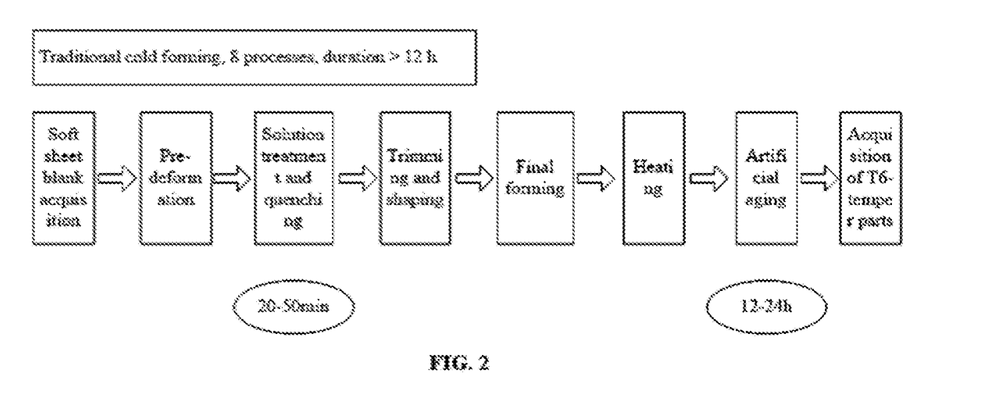
FIG. 2 shows a flow chart of a traditional cold forming procedure of the aluminum alloy.

As shown in FIG. 2, traditional aluminum alloy cold forming needs to conduct 8 processes including soft sheet blank acquisition, pre-deformation, solution treatment and quenching, trimming and shaping, final forming, heating, artificial aging, and acquisition of T6-temper parts, which are expected to take greater than 12 h. As shown in FIG. 3, the method of the present disclosure only needs to conduct 4 processes of pre-hardened sheet blank acquisition, cold forming, trimming and shaping, and acquisition of parts exceeding T6 temper, which are expected to take less than 5 min.

In the present disclosure, the integral forming of the bottom of the rocket fuel storage tank specifically includes the following steps:
step S1, conducting friction stir welding on the 2000 series aluminum alloy sheet blank, and subjecting an obtained welded sheet blank to the solution treatment and quenching, to obtain the W-temper aluminum alloy sheet blank;
step S2, conducting pre-hardening treatment on the W-temper aluminum alloy sheet blank, where the 2000 series aluminum alloy is subjected to the pre-hardening treatment at 60° C. to 180° C.; after the pre-hardening treatment on the sheet blank, the 2000 series aluminum alloy forms the GPII zone with a diameter of 1 nm to 5 nm and a length of 1 nm to 15 nm; and the GPII zones account for 60% to 100%; and the pre-hardened sheet blank is subjected to forming immediately, or stored for not more than 18 months before the forming; and
step S3, conducting cold forming on an obtained welded pre-hardened sheet blank, to obtain a bottom of a rocket fuel storage tank with mechanical properties exceeding T6 and T8 tempers without the solution treatment and artificial aging.

Example 1

Taking a 2219 aluminum alloy as a sheet blank, a short-process high-performance forming method of a high-strength aluminum alloy included the following steps:
(1) the 2219 aluminum alloy sheet blank was heated to 529° C. to 541° C. in a resistance furnace and kept for 40 min to obtain a W-temper aluminum alloy;
(2) the W-temper aluminum alloy was subjected to pre-hardening treatment by heating to 90° C. within 10 min, and kept for 24 h to obtain a pre-hardened sheet blank; and
(3) the pre-hardened sheet blank was subjected to cold stamping to obtain a final product without subsequent aging and heat treatment.

Tensile samples were cut from parts formed by the cold stamping, and mechanical properties of each sample after forming were tested by uniaxial tensile tests, and properties of multiple tensile samples were taken. It was measured that the sample had a tensile strength of 441 MPa and a yield strength of 418 MPa.

Example 2

Taking a 2219 aluminum alloy as a sheet blank, a short-process high-performance forming method of a high-strength aluminum alloy included the following steps:
(1) the 2219 aluminum alloy sheet blank was heated to 529° C. to 541° C. in a resistance furnace and kept for 40 min to obtain a W-temper aluminum alloy;
(2) the W-temper aluminum alloy was subjected to pre-hardening treatment by heating to 130° C. within 10 min, and kept for 12 h to obtain a pre-hardened sheet blank; and
(3) the pre-hardened sheet blank was subjected to cold stamping to obtain a final product without subsequent aging and heat treatment.

Tensile samples were cut from parts formed by the cold stamping, and mechanical properties of each sample after forming were tested by uniaxial tensile tests, and properties of multiple tensile samples were taken. It was measured that the sample had a tensile strength of 450 MPa and a yield strength of 413 MPa.

Example 3

Taking a 2219 aluminum alloy as a sheet blank, a short-process high-performance forming method of a high-strength aluminum alloy included the following steps:
(1) the 2219 aluminum alloy sheet blank was heated to 529° C. to 541° C. in a resistance furnace and kept for 40 min to obtain a W-temper aluminum alloy;
(2) the W-temper aluminum alloy was subjected to pre-hardening treatment by heating to 160° C. within 10 min, and kept for 5 h to obtain a pre-hardened sheet blank; and
(3) the pre-hardened sheet blank was subjected to cold stamping to obtain a final product without subsequent aging and heat treatment.

Figure 4A:
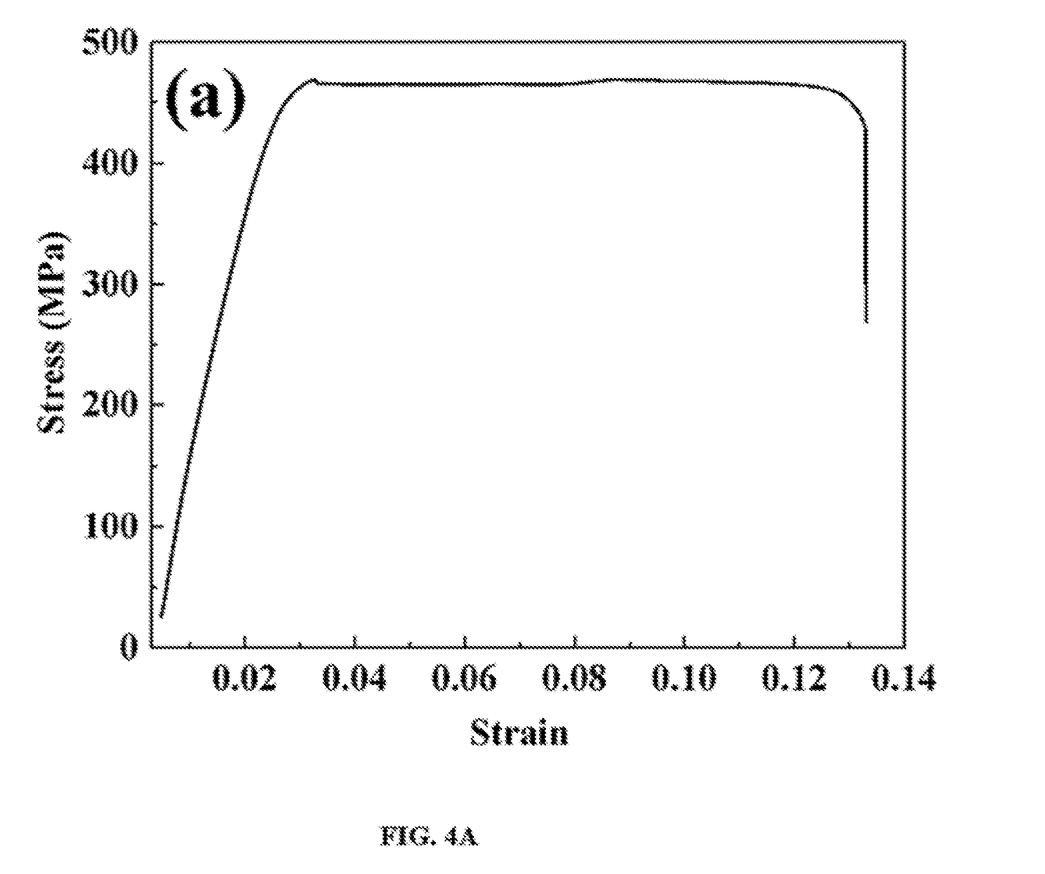
FIGS. 4A-D shows stress-strain curves of aluminum alloy parts.

As shown in FIG. 4A, FIG. 4A was a stress-strain curve of a tensile sample of the 2219 aluminum alloy after pre-hardening treatment and cold forming at 160° C. for 5 h. Tensile samples were cut from parts formed by the cold stamping, and mechanical properties of each sample after forming were tested by uniaxial tensile tests, and properties of multiple tensile samples were taken. It was measured that the sample had a tensile strength of 449 MPa and a yield strength of 425 MPa.

Example 4

Taking a 6061 aluminum alloy as a sheet blank, a short-process high-performance forming method of a high-strength aluminum alloy included the following steps:
(1) the 6061 aluminum alloy sheet blank was heated to 516° C. to 579° C. in a resistance furnace and kept for 40 min to obtain a W-temper aluminum alloy;
(2) the W-temper aluminum alloy was subjected to pre-hardening treatment by heating to 100° C. within 10 min, and kept for 12 h to obtain a pre-hardened sheet blank; and
(3) the pre-hardened sheet blank was subjected to cold stamping to obtain a final product without subsequent aging and heat treatment.

Tensile samples were cut from parts formed by the cold stamping, and mechanical properties of each sample after forming were tested by uniaxial tensile tests, and properties of multiple tensile samples were taken. It was measured that the sample had a tensile strength of 429 MPa and a yield strength of 354 MPa.

Example 5

Taking a 6061 aluminum alloy as a sheet blank, a short-process high-performance forming method of a high-strength aluminum alloy included the following steps:
(1) the 6061 aluminum alloy sheet blank was heated to 516° C. to 579° C. in a resistance furnace and kept for 40 min to obtain a W-temper aluminum alloy;
(2) the W-temper aluminum alloy was subjected to pre-hardening treatment by heating to 130° C. within 10 min, and kept for 6 h to obtain a pre-hardened sheet blank; and
(3) the pre-hardened sheet blank was subjected to cold stamping to obtain a final product without subsequent aging and heat treatment.

Tensile samples were cut from parts formed by the cold stamping, and mechanical properties of each sample after forming were tested by uniaxial tensile tests, and properties of multiple tensile samples were taken. It was measured that the sample had a tensile strength of 426 MPa and a yield strength of 346 MPa.

Example 6

Taking a 6061 aluminum alloy as a sheet blank, a short-process high-performance forming method of a high-strength aluminum alloy included the following steps:
(1) the 6061 aluminum alloy sheet blank was heated to 516° C. to 579° C. in a resistance furnace and kept for 40 min to obtain a W-temper aluminum alloy;
(2) the W-temper aluminum alloy was subjected to pre-hardening treatment by heating to 160° C. Within 10 min, and kept for 4 h to obtain a pre-hardened sheet blank; and
(3) the pre-hardened sheet blank was subjected to cold stamping to obtain a final product without subsequent aging and heat treatment.

Figure 4B:
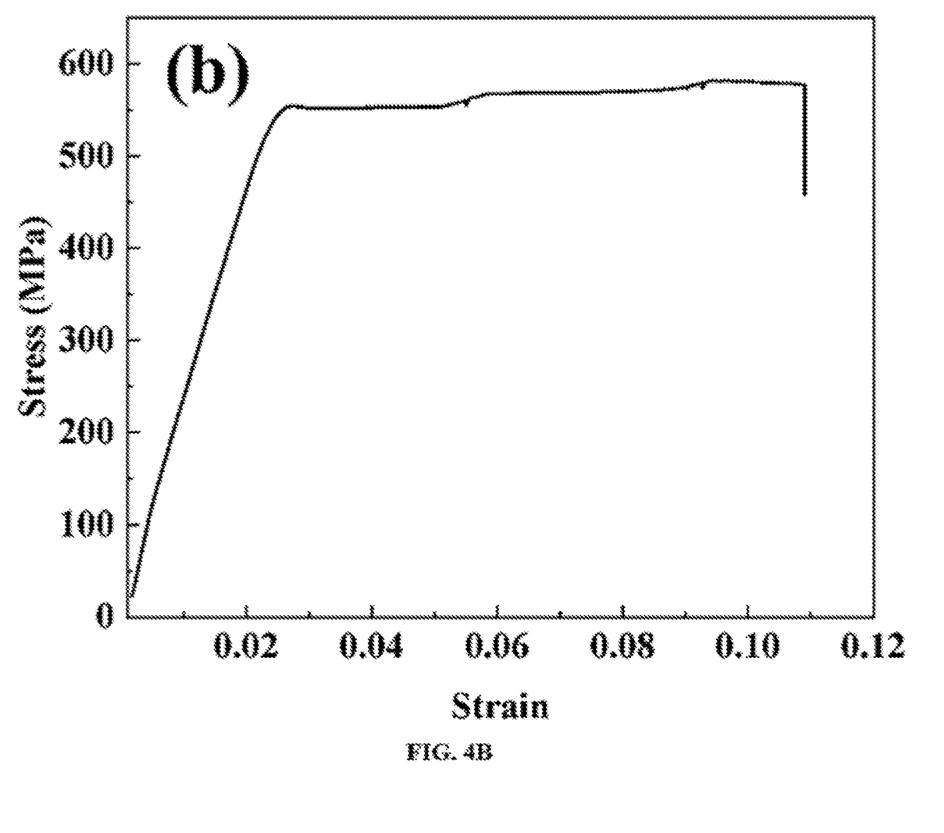
Figure 4C:
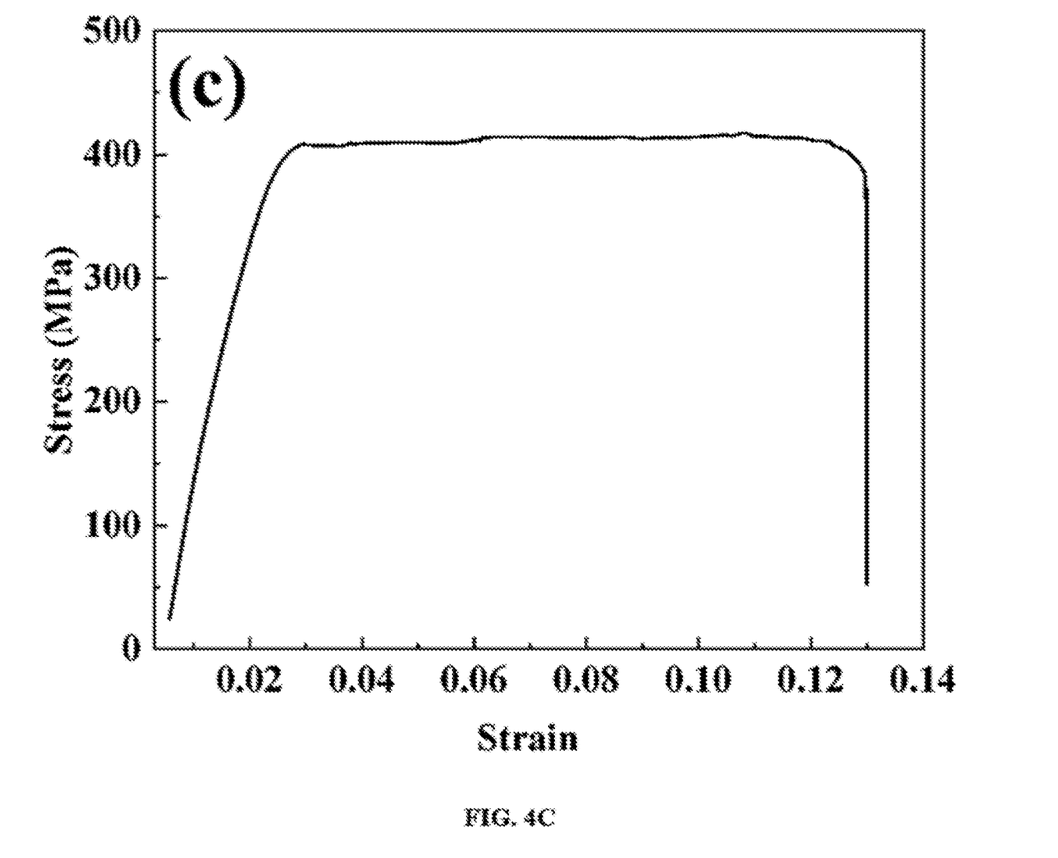

As shown in FIG. 4C, FIG. 4C was a stress-strain curve of a tensile sample of the 6061 aluminum alloy after pre-hardening treatment and cold forming at 160° C. for 4 h. Tensile samples were cut from parts formed by the cold stamping, and mechanical properties of each sample after forming were tested by uniaxial tensile tests, and properties of multiple tensile samples were taken. It was measured that the sample had a tensile strength of 435 MPa and a yield strength of 367 MPa.

Example 7

Taking a 7075 aluminum alloy as a sheet blank, a short-process high-performance forming method of a high-strength aluminum alloy included the following steps:
(1) the 7075 aluminum alloy sheet blank was heated to 450° C. to 499° C. in a resistance furnace and kept for 30 min to obtain a W-temper aluminum alloy;
(2) the W-temper aluminum alloy was subjected to pre-hardening treatment by heating to 70° C. within 10 min, and kept for 12 h to obtain a pre-hardened sheet blank; and
(3) the pre-hardened sheet blank was subjected to cold stamping to obtain a final product without subsequent aging and heat treatment.

Tensile samples were cut from parts formed by the cold stamping, and mechanical properties of each sample after forming were tested by uniaxial tensile tests, and properties of multiple tensile samples were taken. It was measured that the sample had a tensile strength of 579 MPa and a yield strength of 514 MPa.

Example 8

Taking a 7075 aluminum alloy as a sheet blank, a short-process high-performance forming method of a high-strength aluminum alloy included the following steps:
(1) the 7075 aluminum alloy sheet blank was heated to 450° C. to 499° C. in a resistance furnace and kept for 30 min to obtain a W-temper aluminum alloy;
(2) the W-temper aluminum alloy was subjected to pre-hardening treatment by heating to 80° C. within 10 min, and kept for 6 h to obtain a pre-hardened sheet blank.

As shown in FIG. 4B, FIG. 4B was a stress-strain curve of a tensile sample of the 7075 aluminum alloy after pre-hardening treatment and cold forming at 80° C. for 6 h.
(3) the cold forming sheet blank was subjected to cold stamping to obtain a final product without subsequent aging and heat treatment.

Tensile samples were cut from parts formed by the cold stamping, and mechanical properties of each sample after forming were tested by uniaxial tensile tests, and properties of multiple tensile samples were taken. It was measured that the sample had a tensile strength of 581 MPa and a yield strength of 526 MPa.

Example 9

Taking a 7075 aluminum alloy as a sheet blank, a short-process high-performance forming method of a high-strength aluminum alloy included the following steps;
(1) the 7075 aluminum alloy sheet blank was heated to 450° C. to 499° C. in a resistance furnace and kept for 30 min to obtain a W-temper aluminum alloy;
(2) the W-temper aluminum alloy was subjected to pre-hardening treatment by heating to 100° C. within 10 min, and kept for 3 h to obtain a pre-hardened sheet blank; and
(3) the pre-hardened sheet blank was subjected to cold stamping to obtain a final product without subsequent aging and heat treatment.

Tensile samples were cut from parts formed by the cold stamping, and mechanical properties of each sample after forming were tested by uniaxial tensile tests, and properties of multiple tensile samples were taken. It was measured that the sample had a tensile strength of 575 MPa and a yield strength of 523 MPa.

Example 10

Taking a 2219 aluminum alloy as a sheet blank, a short-process high-performance forming method of a high-strength aluminum alloy used in a bottom of a rocket fuel storage tank included the following steps;
(1) the 2219 aluminum alloy sheet blank was heated to 529° C. to 541° C. in a resistance furnace and kept for 40 min to obtain a W-temper aluminum alloy;
(2) the W-temper aluminum alloy was subjected to pre-hardening treatment by heating to 160° C. within 10 min, and kept for 3 h to obtain a pre-hardened sheet blank; and
(3) the pre-hardened sheet blank was subjected to cold stamping to obtain a melon-shaped sectionalized part.

Tensile samples were cut from parts formed by the cold stamping, and mechanical properties of each sample after forming were tested by uniaxial tensile tests, and properties of multiple tensile samples were taken. It was measured that the sample had a tensile strength of 449 MPa and a yield strength of 425 MPa.

Example 11

Taking a 2219 aluminum alloy as a sheet blank, a short-process high-performance forming method of a high-strength aluminum alloy used in a bottom of a rocket fuel storage tank included the following steps:
(1) the 2219 aluminum alloy sheet blank was heated to 529° C. to 541° C. in a resistance furnace and kept for 40 min to obtain a W-temper aluminum alloy;
(2) the W-temper aluminum alloy was subjected to pre-hardening treatment by heating to 120° C. within 10 min, and kept for 15 h to obtain a pre-hardened sheet blank;
(3) the pre-hardened sheet blank was subjected to friction stir welding to obtain a formed sheet blank; and
(4) the formed sheet blank was subjected to cold stamping to obtain an integral part of the bottom of the storage tank.

Tensile samples were cut from parts formed by the cold stamping, and mechanical properties of each sample after forming were tested by uniaxial tensile tests, and properties of multiple tensile samples were taken. It was measured that the sample had a tensile strength of 413 MPa and a yield strength of 365 MPa.

Example 12

Taking a 2219 aluminum alloy as a sheet blank, a short-process high-performance forming method of a high-strength aluminum alloy used in a bottom of a rocket fuel storage tank included the following steps:

(1) the 2219 aluminum alloy sheet blank was subjected to friction stir welding;

(2) an obtained welded 2219 aluminum alloy sheet blank was heated to 529° C. to 541° C. in a resistance furnace and kept for 40 min to obtain a W-temper aluminum alloy;

(3) the W-temper aluminum alloy was subjected to pre-hardening treatment by heating to 140° C. within 10 min, and kept for 7 h to obtain a pre-hardened sheet blank; and (4) the pre-hardened sheet blank was subjected to cold stamping to obtain an integral part of the bottom of the storage tank.

Figure 4D:
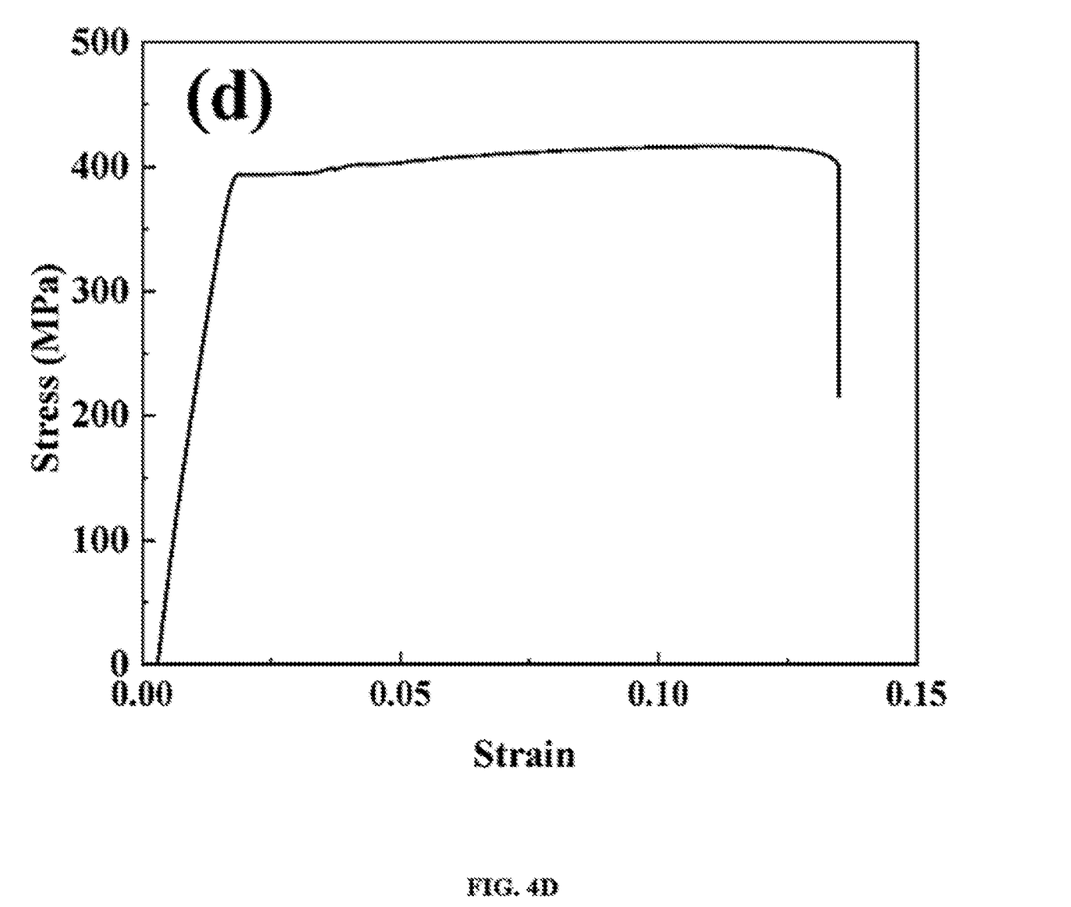

As in FIG. 4D, FIG. 4D was a stress-strain curve of a tensile sample of the bottom of the rocket fuel storage tank made from the 2219 alloy after pre-hardening treatment and cold forming at 140° C. for 7 h. Tensile samples were cut from parts formed by the cold stamping, and mechanical properties of each sample after forming were tested by uniaxial tensile tests, and properties of multiple tensile samples were taken. It was measured that the sample had a tensile strength of 411 MPa and a yield strength of 374 MPa.

In summary, the mechanical properties in Examples 1 to 12 were shown in the following table:

TABLE 1

Summary of mechanical properties of parts in examples

| Material | Pre-hardening treatment system | Strength after forming/MPa | | Strength of T6-temper alloy/MPa | |
|---|---|---|---|---|---|
| | | Tensile intensity | Yield intensity | Tensile intensity | Yield intensity |
| 2219 | 90° C./24 h | 441 | 418 | 392 | 287 |
| | 130° C./12 h | 450 | 413 | | |
| | 160° C./5 h | 449 | 425 | | |
| 6061 | 100° C./12 h | 429 | 354 | 290 | 240 |
| | 130° C./6 h | 426 | 346 | | |
| | 160° C./4 h | 435 | 367 | | |
| 7075 | 70° C./12 h | 579 | 514 | 565 | 491 |
| | 80° C./6 h | 581 | 526 | | |
| | 100° C./3 h | 575 | 523 | | |

TABLE 1-continued

Summary of mechanical properties of parts in examples

| Material | Pre-hardening treatment system | Bottom of rocket fuel storage tank Strength of part/MPa | | Strength of T6-temper alloy/MPa | |
|---|---|---|---|---|---|
| | | Tensile intensity | Yield intensity | Tensile intensity | Yield intensity |
| 2219 | 160° C./3 h | 449 | 425 | 392 | 287 |
| | 120° C./15 h | 413 | 365 | | |
| | 140° C./7 h | 411 | 374 | | |

The specific embodiments described herein are merely intended to illustrate the spirit of the present disclosure by way of example. A person skilled in the art can make various modifications or supplements to the specific embodiments described or replace them in a similar manner, but it may not depart from the spirit of the present disclosure or the scope defined by the appended claims.

What is claimed is:

1. A forming method of an aluminum alloy, comprising the following steps:

step S1, conducting a solution treatment and quenching on a heat-treatable strengthened aluminum alloy sheet blank, to obtain a W-temper aluminum alloy sheet blank, wherein the heat-treatable strengthened aluminum alloy sheet blank is selected from the group consisting of a 2000 series aluminum alloy sheet blank and a 6000 series aluminum alloy sheet blank and a 7000 series aluminum alloy sheet blank;

step S2, conducting pre-hardening treatment on the W-temper aluminum alloy sheet blank for 1 h to 24 h to obtain a pre-hardened sheet blank, wherein under a condition that the heat-treatable strengthened aluminum alloy sheet blank is the 2000 series aluminum alloy sheet blank, the pre-hardening treatment is carried out at 130° C. to 180° C., and forms a GPII zone with a diameter of 1 nm to 5 nm and a length of 1 nm to 15 nm in the pre-hardened sheet blank; under a condition that the heat-treatable strengthened aluminum alloy sheet blank is the 6000 series aluminum alloy sheet blank, the pre-hardening treatment is carried out at 130° C. to 160° C. and forms a GPII zone with a diameter of 1 nm to 5 nm and a length of 1 nm to 30 nm in the pre-hardened sheet blank, the GPII zone comprising initial β" and pre β", and wherein the GPII zone accounts for 60% to 100% of the pre-hardened sheet blank;

step S3, using the pre-hardened sheet blank blank as a batch supply blank for cold forming; and step S4, conducting cold forming on the pre-hardened sheet blanks blank, such that the pre-hardened sheet blank has a deformation of 1% to 20%, to obtain a final component.

* * * * *

UNITED STATES PATENT AND TRADEMARK OFFICE
CERTIFICATE OF CORRECTION

PATENT NO. : 11,913,104 B2
APPLICATION NO. : 18/208264
DATED : February 27, 2024
INVENTOR(S) : Zhili Hu et al.

It is certified that error appears in the above-identified patent and that said Letters Patent is hereby corrected as shown below:

In the Claims

Column 12, Lines 31 through 32, in Claim 1 should be:
the group consisting of a 2000 series aluminum alloy sheet blank, and a 6000 series aluminum alloy sheet blank;

Signed and Sealed this
Second Day of April, 2024

Katherine Kelly Vidal
*Director of the United States Patent and Trademark Office*